United States Patent
Ciccolella et al.

(10) Patent No.: US 6,418,200 B1
(45) Date of Patent: Jul. 9, 2002

(54) AUTOMATIC SYNCHRONIZATION OF ADDRESS DIRECTORIES FOR UNIFIED MESSAGING

(75) Inventors: Sergio A. Ciccolella, Mountain View; David Randall Ronca, San Jose, both of CA (US)

(73) Assignee: Mitel, Inc., Herndon, VA (US)

( * ) Notice: Subject to any disclaimer, the term of this patent is extended or adjusted under 35 U.S.C. 154(b) by 0 days.

(21) Appl. No.: 09/259,811

(22) Filed: Feb. 26, 1999

(51) Int. Cl.[7] .............................. H04M 1/64; H04M 3/42
(52) U.S. Cl. ..................... 379/88.18; 379/67.1; 379/68; 379/88.13; 379/88.17; 379/88.22; 379/201.02
(58) Field of Search ........................... 379/67.1, 76, 83, 379/88.08, 88.09, 88.13, 88.14, 88.22, 88.23, 88.25, 88.27, 88.28, 15.03, 201.01, 201.02, 201.12, 88.04, 88.17, 88.18, 88.24; 455/414, 417, 445, 461

(56) References Cited

U.S. PATENT DOCUMENTS

| | | | | |
|---|---|---|---|---|
| 5,333,266 A | * | 7/1994 | Boaz et al. ................. | 395/200 |
| 5,349,636 A | | 9/1994 | Irribarren ................. | 379/88.15 |
| 5,530,740 A | | 6/1996 | Irribarren et al. ........ | 379/88.17 |
| 5,608,786 A | * | 3/1997 | Gordon ...................... | 379/100 |
| 5,647,002 A | * | 7/1997 | Brunson ..................... | 380/49 |
| 5,737,395 A | | 4/1998 | Irribarren ................. | 379/88.13 |
| 5,740,231 A | | 4/1998 | Cohn et al. .............. | 379/88.22 |
| 5,742,905 A | * | 4/1998 | Pepe et al. ................. | 455/461 |
| 5,760,823 A | * | 6/1998 | Brunson et al. ............. | 348/14 |
| 5,841,966 A | | 11/1998 | Irribarren .................. | 709/206 |
| 5,948,059 A | * | 9/1999 | Woo et al. ................. | 709/206 |
| 5,951,638 A | * | 9/1999 | Hoss et al. ................ | 709/206 |

FOREIGN PATENT DOCUMENTS

EP          0 295 904 A2    12/1988

* cited by examiner

*Primary Examiner*—Allan Hoosain
(74) *Attorney, Agent, or Firm*—Beyer Weaver & Thomas, LLP (57) ABSTRACT

A messaging system to store and retrieve messages for playback in response to user input commands includes a telephony messaging application responsive to incoming calls. A directory stores addressing information concerning addressable entities within the messaging system. The telephony messaging application accesses the directory in response to caller address queries. A post office stores user messages and includes addressing information concerning addressable entities within the messaging system. A synchronization mechanism synchronizes the addressing information in the directory with addressing information in the post office.

47 Claims, 5 Drawing Sheets

AUTOMATIC SYNCHRONIZATION OF ADDRESS DIRECTORIES FOR UNIFIED MESSAGING

CROSS-REFERENCE TO RELATED APPLICATIONS

This application is related to: (i) U.S. patent application No. 09/258,507, filed on same day herewith, entitled "TEXT-TO-SPEECH CONVERTER", (ii) U.S. patent application No. 09/258,717, filed on same day herewith, entitled "AUTOMATIC USER PREFERENCE SELECTION FOR MESSAGE PLAYBACK BASED ON CALLER LINE IDENTIFICATION DATA", and (iii) U.S. patent application No. 09/259,463, filed on same day herewith, entitled "DIAL BY NAME FEATURE FOR MESSAGING SYSTEM"; all of which are all incorporated herein by reference for all purposes.

FIELD OF THE INVENTION

The present invention relates generally to messaging systems and, in particular, to a messaging system and method for maintaining synchronization of address directories.

BACKGROUND OF THE INVENTION

Voice messaging systems are common in today's business community. Most business organizations or enterprises make use of a private branch exchange (PBX) to direct a caller's telephone call to the appropriate extension of the called party. If the called party is unable to answer the telephone call, the telephone call is forwarded to a voice messaging system, which allows the caller to leave a voice message in the mailbox assigned to the called party. Messages left for called parties within the business organization can be retrieved from memory by calling the voice messaging system using a telephone and entering appropriate commands via a touch-tone keypad. Retrieved messages can be played, forwarded or deleted. An example of a voice messaging system of this nature is the Series 6 sold by Mitel Corporation of Ottawa, Ontario, Canada.

In addition to voice messages, communications within business organizations are also stored in facsimile and text formats. In the past, separate messaging systems have been used to handle these different types of communications. Unfortunately, prior art messaging systems designed to handle one type of communication have not provided any means to interact with messaging systems handling other types of communications. This has required users to access each messaging system individually to retrieve messages and has required business organizations to maintain and manage multiple messaging systems separately. As a result, it has been necessary to establish separate accounts, address lists and message mailboxes in each messaging system for the various users in the business organizations.

More recently, attempts have been made to interconnect different messaging systems to provide access to different types of messages from a single point. For example, U.S. Pat. No. 5,349,636 to Irribarren discloses a system and method for voice mail systems and interactive voice response (IVR) systems. The Irribarren system includes a voice message system and a text message system integrated via a network, which coordinates the functions of each individual message system. A user may access messages stored in the voice message system and in the text message system via a single telephone call. Although this system allows access to different types of messages, the voice message and text message systems require separate management.

The current trend is to integrate these various messaging systems to allow users to access all types of communications once a connection is made to the messaging system. To that end, unified messaging systems have been developed to provide users access to virtually all of their communications. Messaging systems of this nature store all messages for entities within the enterprise at a common location. The entities may be individuals, groups, departments, or any appropriate logical organizations. Users accessing the messaging system via a telephone, desktop computer or other communication device have access to all of their messages regardless of message type and regardless of the type of communication device used to access the messaging system. Appropriate message translators such as text-to-speech (TTS) converters, speech-to-text (SST) converters, etc. are included to enable users to retrieve messages stored in formats not supported by the communication devices used to access the messaging system.

Although users may access the messaging system using a telephone or desktop computer, the needs of a user accessing the messaging system using a telephone are different than those of a user accessing the messaging system using a desktop computer. In the case of sending messages created via a telephone connection to the messaging system, addressing is of particular concern. Address directories are often distributed throughout an enterprise for many reasons such as directory population, system capacity, geographical dispersion, etc. However, when using a telephone to access the messaging system, due to the nature of the interface, access to dispersed directories has typically been slow if not impossible. Access speed is of course an important issue for messaging systems.

In the past, address directories in local telephony messaging servers of messaging systems have been populated with knowledge of all remote users to allow local users to address messages to the remote users. This has of course required extensive management to ensure all non-local directories are updated when a directory change has been made. Accordingly, improvements to addressing in messaging systems are desired.

Thus, there is a need for maintaining synchronization of address directories in messaging systems.

SUMMARY OF THE INVENTION

The present invention provides a messaging system where telephony functions of the messaging system are handled by a telephony messaging application while messages are stored at a separate post office, which maintains the directory or database of the messages as well as address information. To facilitate fast and efficient access to addressing information, the telephony messaging application maintains a local directory for enterprise wide addressing. This local directory, which is a subset of the addressing information maintained at the post office, provides a fast addressing look-up service catering specifically to telephony users. Since the number of fields of addressing information stored in the local directory is typically less than that of any post office or external directory, the overall size of records in the local directory is small. The result is a compact and efficient directory storing records of addressing information from multiple post offices and external directories. Furthermore, since the local directory is automatically synchronized with the addressing information in the post office, the accuracy of the local directory is maintained at a high level.

According to one aspect of the present invention there is provided a messaging system to store and retrieve messages for playback in response to user input commands, and which includes: a telephony messaging application responsive to incoming calls; a directory storing addressing information concerning addressable entities within said messaging system, said telephony messaging application accessing said directory in response to caller address queries; a post office to store user messages and including updatable addressing information concerning addressable entities within said messaging system; and a synchronization mechanism to synchronize the addressing information in said directory with addressing information in said post office.

In one embodiment, the synchronization mechanism is triggered in response to selected events and at selected intervals. The selected events include specified changes to critical addressing data stored in the post office. These specified changes may include changes to spoken greetings, changes to message destination data, and changes enabling telephone access to the messaging system.

In another embodiment, the selected intervals are programmable. As an example, the synchronization mechanism can be responsive to a timer in the telephony messaging application which fires at the selected intervals.

In still another embodiment, the synchronization mechanism includes an event notifier responsive to the timer and a directory service in communication with the post office. The event notifier polls the post office for addressing information that has changed since the last polling cycle. The directory service receives changed addressing information from the post office and updates the directory accordingly.

In yet another embodiment, the synchronization mechanism further validates all of the addressing information in the directory with corresponding addressing information in the post office at specified second intervals and synchronizes its clock with the post office clock at the selected intervals.

According to yet another aspect of the present invention there is provided in an messaging system, a method for synchronizing addressing information stored in a directory of a telephony messaging application with addressing information stored in a post office, said method comprising: at selected intervals, determining if changes to the addressing information in said post office have been made and, if so, updating the addressing information in said directory; and in response to selected changes in addressing information in said post office, updating the addressing information in said directory.

According to yet another aspect of the present invention there is provided in an messaging system, a method for synchronizing addressing information stored in a directory for a telephony messaging application with addressing information stored in a central database, said method comprising: determining when specific events have occurred at the telephony application; promptly synchronizing the directory and the central database with respect the specific events that have been determined to have occurred; and otherwise periodically synchronizing the directory and the central database at a predetermined time interval.

BRIEF DESCRIPTION OF THE DRAWINGS

An embodiment of the present invention will now be described more fully with reference to the accompanying drawings in which.

DETAILED DESCRIPTION OF THE INVENTION

Figure 1:
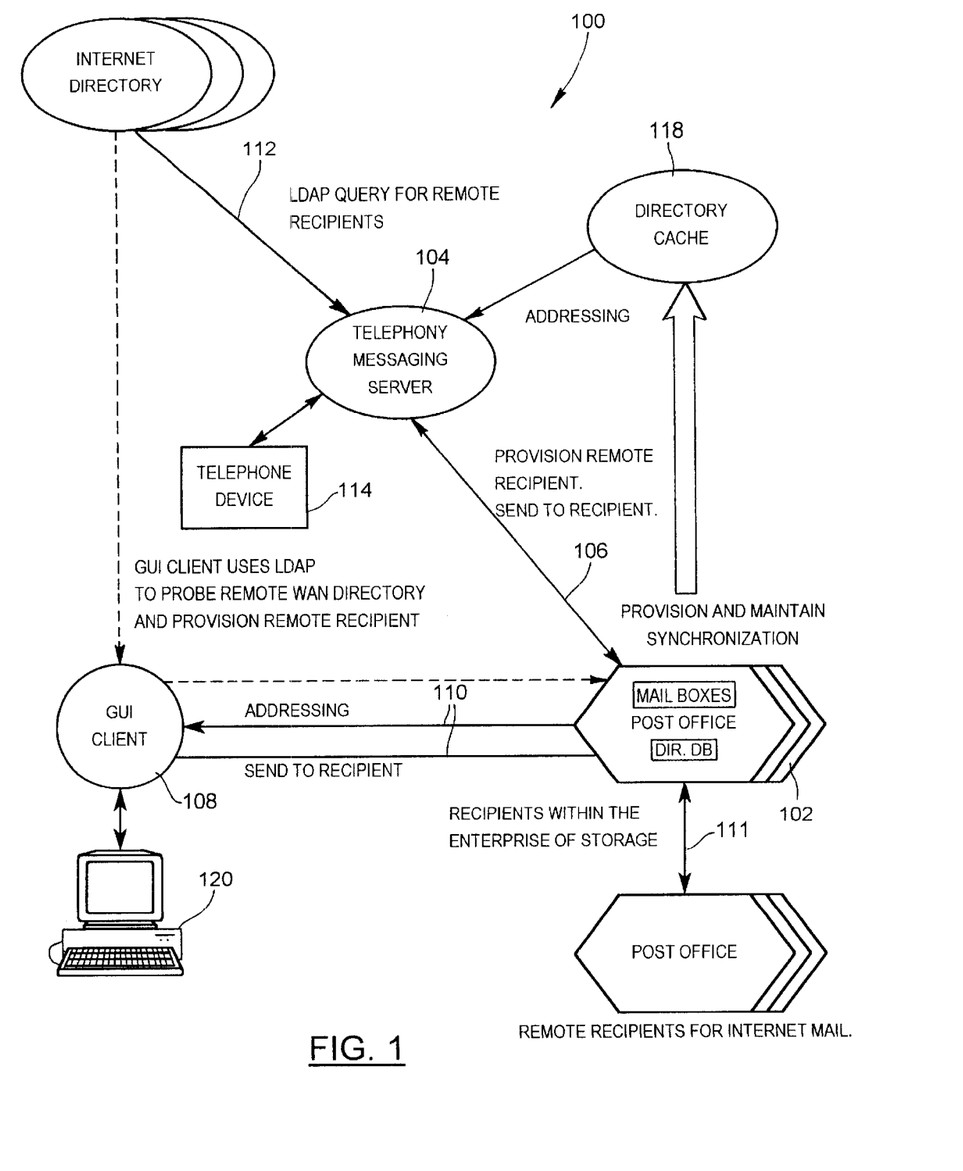
FIG. 1 is a diagrammatic overview of a unified messaging system in accordance with the present invention.

Turning now to FIG. 1, a messaging system is shown and is generally indicated by reference numeral 100. Messaging system 100 includes a post office 102 communicating with a telephony messaging server 104. The post office 102 runs on one or more servers behaving logically as a single entity and is connected to the telephony server 104 via a local area network 106. Post office 102 communicates with clients 108, only one of which is shown for illustrative purposes, via a local area network, modem or other communication channel 110. Post office 102 and telephony messaging server 104 also communicate with external messaging systems via wide area networks 111 and 112 respectively.

The post office 102 provides message storage and delivery facilities for users of the messaging system 100 and includes mailboxes in which messages for the users are stored. The post office 102 handles and stores user messages regardless of format. Thus, the post office 102 stores voice and facsimile messages received from the telephony messaging server 104 as well as text messages, facsimile messages, graphics messages etc. Received from client 108 and/or wide area network 111. The post office 102 also maintains a directory database of enterprise wide user information including addresses, locations and addressing related information as well as user preference records as will be described. The directory database information is accessible, retrievable and updatable using database type queries. In the preferred embodiment, post office 102 runs commercially available post office software such as Microsoft Exchange® sold by Microsoft Corporation of Redmond, Wash.

In one embodiment, telephony messaging server 104 is a model TS800 telephony server provided by Mitel Corporation of Ottawa, Ontario or similar PC-based model. The telephony messaging server 104 executes a voice messaging application to handle incoming telephone calls which cannot be completed. As is well known to those of skill in the art, the voice messaging application includes a speech file administrator which retrieves prerecorded voice message prompts from a database to direct a caller to leave a message for a particular called party. Messages recorded by the voice messaging application are conveyed to the post office 102 for storage in the appropriate mailboxes. The voice messaging application also handles incoming user calls to allow users to retrieve messages stored in their mailboxes.

Telephony users may access the voice messaging application using a typical telephone or telephony device 114 providing telephone functions that is either directly connected to telephony messaging server 104 or connected to the telephony messaging server 104 through a private branch exchange (PBX) and a publicly switched telephone network PSTN (not shown). During access, users enter touch-tone commands and passwords to retrieve messages from their mailboxes in the post office 102. The voice messaging application calls the speech file administrator, which provides the appropriate voice message prompts to navigate users through the voice messaging application. During message playback, if a message stored in a user's mailbox is in a format not supported by the telephone or telephony device 114 used to access the messaging system 100, the voice messaging application calls an appropriate message translator to convert the message into a form which can be played back to the user.

The telephony messaging server 104 communicates with a directory cache 118 that is updated by the post office 102. The directory cache 118 stores a subset of the information stored by the post office 102. Specifically, the directory cache stores addressing information for users and groups associated with the messaging system 100. The telephony messaging server 104 accesses the directory cache 118 in response to user and caller queries made via a telephone device 114 to reduce directory search times and provide a fast addressing service as will be described.

Client 108 in this embodiment, is associated with or in the form of a computing device such as a personal computer 120. Through personal computer 120, a user can access voice messages, facsimile messages, electronic mail messages, etc. stored in their post office mailbox. The user can also use personal computer 120 to perform messaging functions such as create, attach, read, modify, reply, forward, store and delete messages of various types. In one embodiment, the personal computer 120 runs Microsoft Outlook® client messaging software sold by Microsoft Corporation. The client messaging software provides a graphical user interface (GUI) to display the user's messages held in their post office mailbox and to allow the user to invoke messaging functions. Since the mailboxes store messages in different formats, it is preferred that the personal computer 120 includes appropriate hardware and software to allow all message types to be retrieved. In cases where the personal computer 120 does not include the hardware and/or software necessary to support certain message types, appropriate message translators can be called to convert the messages into a form compatible with the personal computer 120.

A user wishing to deliver a message to or retrieve a message from another user through a connection to the telephony messaging server 104 via a telephone device 114 has different needs and requirements than a user who obtains access to post office 102 through personal computing device 120. Speed of access and message addressing are especially important when using a telephone device since telephony devices are typically auditory in nature with no visual feedback. Furthermore, tasks invoked via a telephone device 114 are serialized so that activities cannot be performed while waiting. Therefore, to provide for the unique needs of a user accessing the messaging system 100 via a connection to the telephony messaging server 104 through a telephone device 114, the directory cache 118 is utilized.

The telephony messaging server 104 maintains the directory cache 118 for enterprise wide addressing and optionally also for external addressing. The directory cache 118 provides a fast addressing look-up service and allows the telephony messaging server 104 to perform messaging to any recipient in the enterprise without a degradation of response time. Optionally, the telephony messaging server 104 can be configured to query remote post offices to obtain addressing information for remote users and entities outside the enterprise. In one embodiment, the directory cache 118 is implemented as a database within telephony messaging server 104 and, more particularly, can be a commercially available SQL database providing remote query and update functions.

Figure 2:
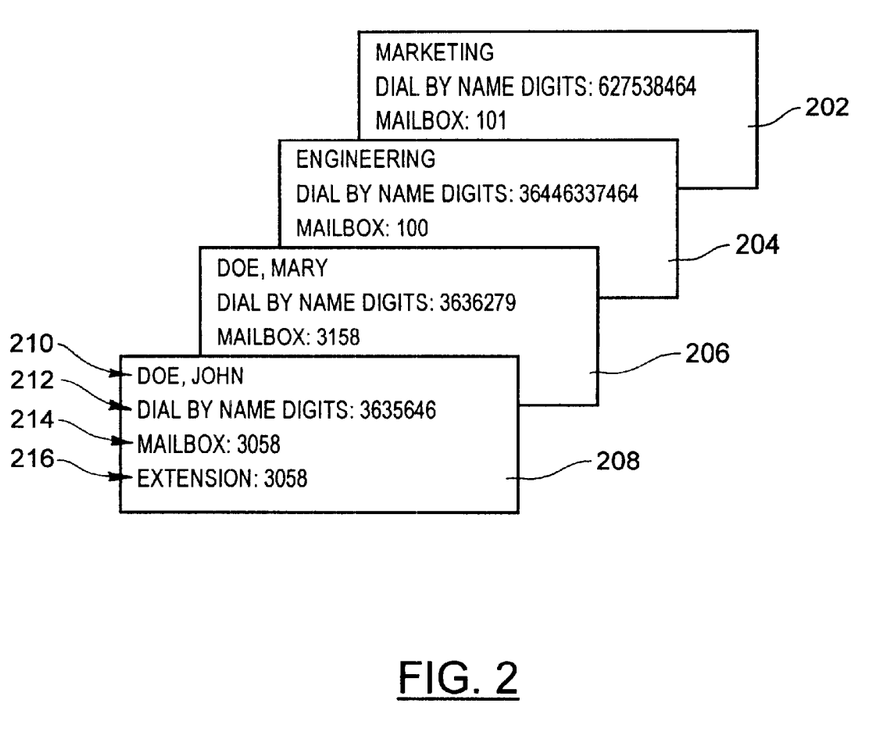
FIG. 2 is a diagrammatic representation of directory cache records stored in a directory cache forming part of the unified messaging system of FIG. 1.

Within the directory cache database is a directory cache record for each addressable user, group, department and logical organization, collectively referred to as entities within the enterprise. Turning now to FIG. 2, a plurality of directory cache records 202 to 208 are shown for illustrative purposes. It should be appreciated that many more directory cache records than those illustrated are included in the directory cache 118. As can be seen, each directory cache record includes a name field 210, a dial by name field 212, a mailbox field 214, and an extension field 216. The fields described above are not meant to be exhaustive and other fields can be included in the directory cache records if desired. The dial by name field 212 holds digits corresponding to the spelling of the name in the name field 210 using a touch-tone keypad, regardless of whether the name is an individual, group, department or logical organization within the enterprise. In this particular example, directory cache records 206 and 208 are assigned to individuals within the enterprise while directory cache records 202 and 204 are assigned to departments within the enterprise. The telephony messaging server 104 uses the information in the directory cache records to facilitate addressing of messages to be sent to other users, groups, departments or logical organizations within the enterprise. The digits in the dial by name fields 212 allow a user to, direct messages by dialing the recipient's name. Further details of the dial,by name feature are described in co-pending U.S. application Ser. No. 09/259, 463 filed on even date for an invention entitled "Dial By Name Feature in Messaging System," the contents of which are incorporated herein by reference.

Table 1 below shows further detail concerning representative information stored in each directory cache record and the rationale for storing the information.

TABLE 1

| CACHE DATA | RATIONALE |
| --- | --- |
| Post Office User ID | Give the Post Office a unique addressing identifier. |
| Display Name | Convenient search criteria but may not be unique. |
| Dial By Name Digits | Search by entering digits corresponding to the concatenation of Last Name and First Name and converted to their numeric match on the telephone keypad. |
| Mailbox Number | Numeric identification of subscriber. Not required to be identical to the telephone extension. |
| Telephone Extension Number | Outside identification of number dialed to reach the subscriber. |
| Fax Direct Inward Dial Number | Direct number dialed to deposit faxes in the Unified Messaging Mailbox. |
| User Spoken Name | Provides confirmation of recipient when subscriber creates a message for delivery. |
| User Spoken Greeting | Provides confirmation to outside caller depositing a voice message from a telephone. |

Directory cache 118 and post office 102 store corresponding addressing and related information for the users within the enterprise. Therefore, in order to maintain addressing integrity, it is necessary to ensure the directory cache 118 and post office 102 are synchronized. To achieve this, both the telephony messaging server 104 and post office 102 include synchronization components in the form of software processes to maintain their respective address directories. During synchronization, the telephony messaging server 104 connects to the post office 102 and makes queries to automatically obtain and update the addressing information in the directory cache 118. In the preferred embodiment, telephony messaging server 104 uses the industry standard messaging application programming interface (MAPI) to create time polling queries and uses distributed programming techniques to create queries and receive event notifications as will be described further below.

Figure 3:
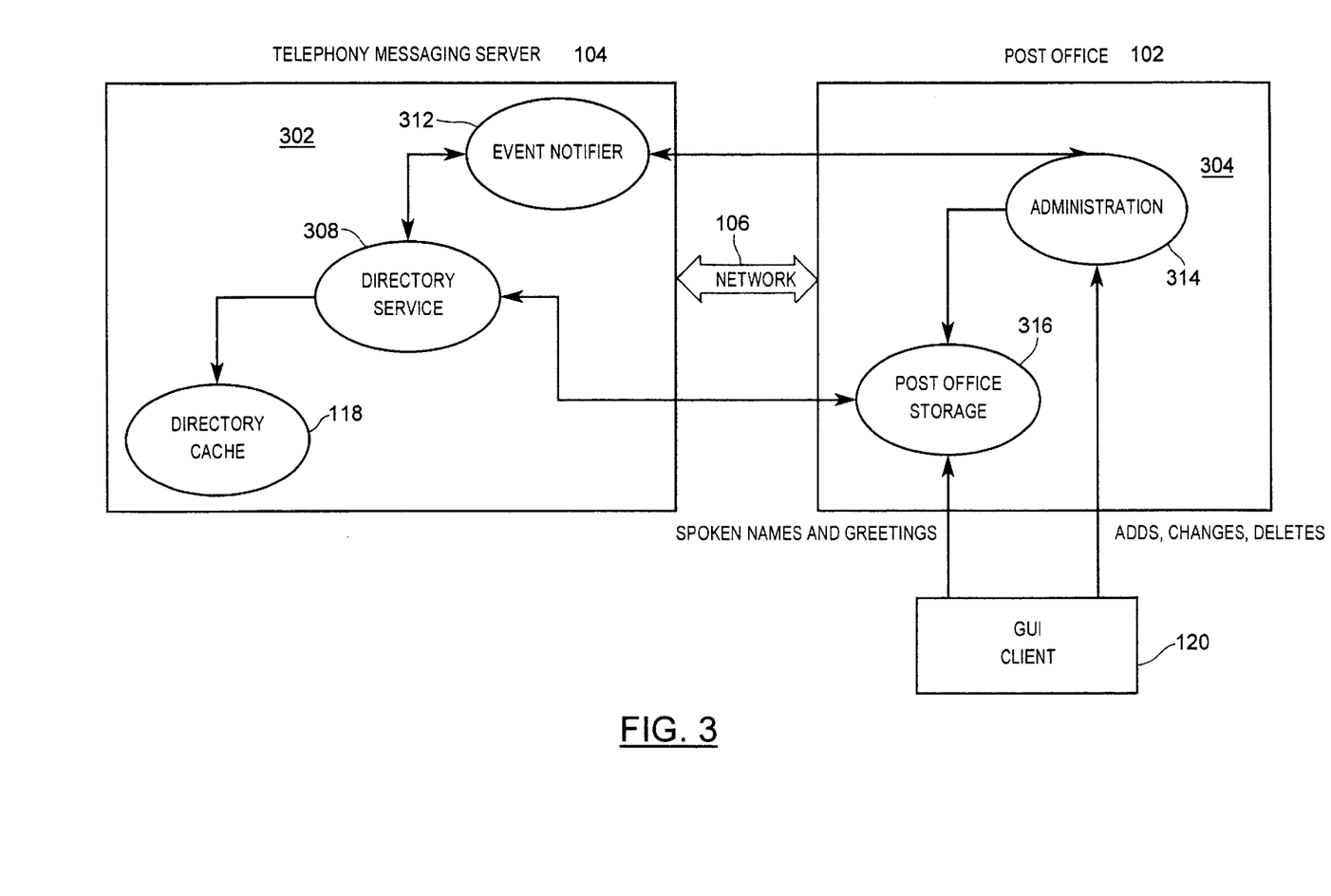
FIG. 3 is a diagrammatic representation of the synchronization processing in the unified messaging system of FIG. 1.

Turning to FIG. 3, the synchronization components of the directory cache 118 and the post office 102 are better illustrated. The synchronization component of the telephony messaging server 104 includes a directory service 308 and an event notifier 312. The directory service 308 manages and synchronizes the directory cache 118 and performs any necessary data translation functions. Event notifier 312 communicates with the directory service 308 and with the post office 102. The event notifier 312 receives and transmits messages when events occur. Events may be triggered by the directory service 308 or by the post office 102.

The synchronization component of the post office 102 includes an administrative component 314 and a post office storage 316. The administrative component 314 communicates with the post office storage 316, the event notifier 312 and the personal computer 120 through the GUI. Access to the administrative component 314 via the personal computer 120 allows a user to add, change and delete address information within the post office storage 316. The administrative component 314 monitors the post office storage 316 and coordinates the transfer of messages and the synchronization of the post office 102 with other address directories (including directory cache 118). The administrative component 314 also performs any necessary data translation functions.

Changes to address information in the post office 102 may be initiated through personal computer 120 as mentioned above or via a telephone device 114 through the telephony messaging server 104. In order to maintain consistency and coherency between the directory cache 118 and the post office 102, a robust but flexible synchronization mechanism is required. In the present embodiment, the synchronization components of the telephony messaging server 104 and the post office 102 use a combination of polling based synchronization and event based synchronization to ensure that the addressing information stored in the directory cache 118 and the post office 102 are the same. While it is important to maintain accurate directory data, frequent updates can expend a lot of processing resources to the detriment of overall messaging system performance. By selecting the type of synchronization mechanism to be used based on the type of directory change, address directory integrity can be maintained while avoiding excess use of processing time. Specifically, data which is key to addressing is updated immediately using event based synchronization, while non-critical addressing data is updated using polling based synchronization.

Referring now to Table 2 below, the types of data changes that are synchronized using event based synchronization are illustrated in the column entitled Immediate. The types of data changes that are synchronized using polling based synchronization are illustrated in the column entitled Poll Cycle Interval. Table 2 also shows data changes that are dealt with by validation.

TABLE 2

| IMMEDIATE | POLL CYCLE INTERVAL (default every 10 minutes) | VALIDATION (default 1X day, 1st poll after 2 a.m.) |
| --- | --- | --- |
| Spoken Greetings | Spoken Name changed from the GUI | |

TABLE 2-continued

| IMMEDIATE | POLL CYCLE INTERVAL (default every 10 minutes) | VALIDATION (default 1X day, 1st poll after 2 a.m.) |
| --- | --- | --- |
| All administrator Unified Messaging data (tel#, MB#, fax DID#) relevant to addressing messages | First Name and Last Name from the administrator changing a user's name | |
| Adds, Changes to enable Unified Messaging telephone access by the subscriber | | User deleted by administrator from outside Unified Messaging control |

The combination of event based synchronization and polling based synchronization yields an efficient mechanism which achieves a balance between frequent polling cycles that consume too many resources and the necessity to synchronize immediate changes between the directory cache 118 and the post office 102. Specifics of the polling based synchronization methodology will now be described with particular reference to FIG. 4.

Figure 4:
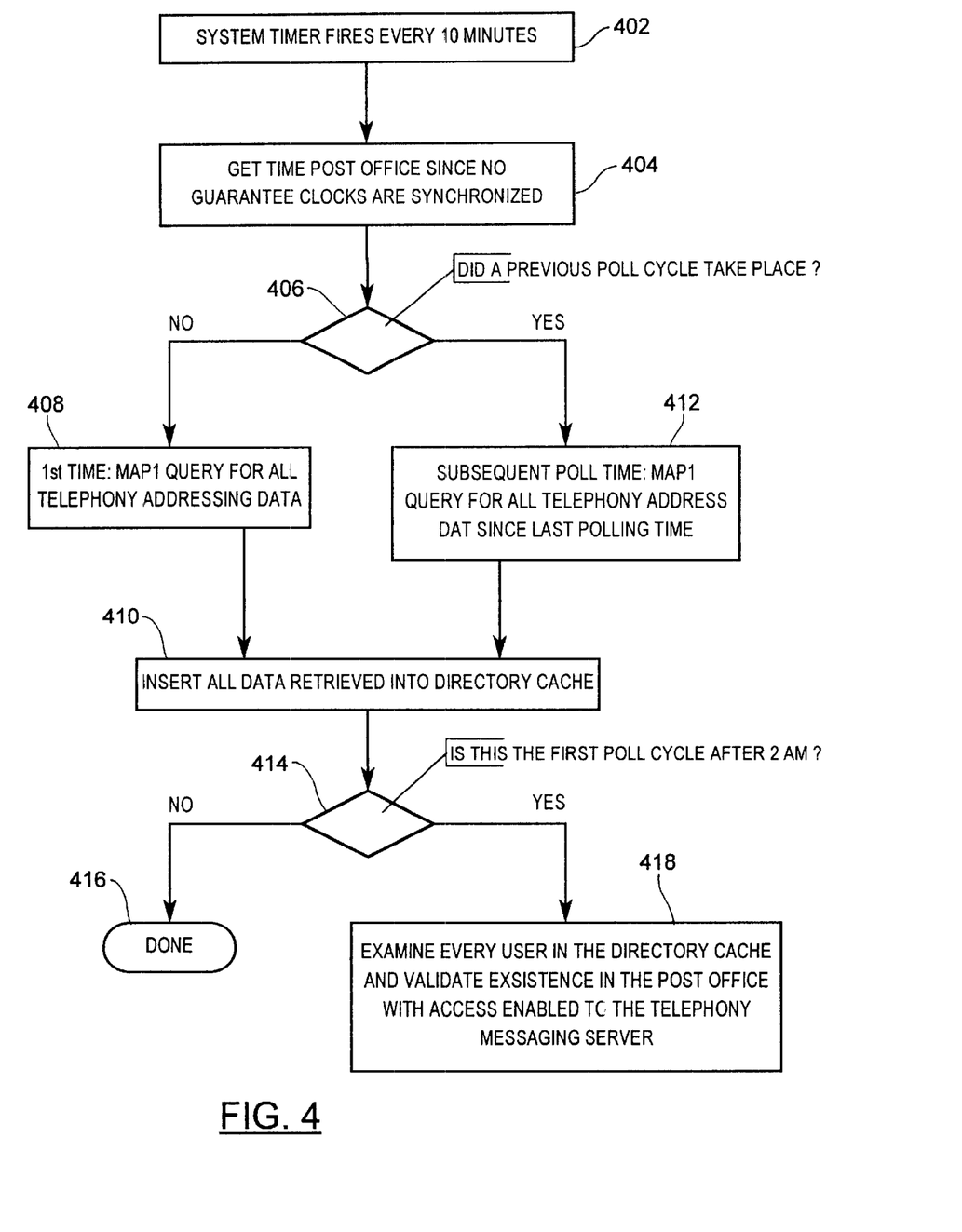
FIG. 4 is a flowchart diagram illustrating polling based synchronization of the unified messaging system of FIG. 1.

Upon initialization, the telephony messaging server 104 initiates a timer that fires at predetermined intervals, which may vary in length depending on the circumstances (block 402). In one embodiment, the timer fires in a regular cycle, typically every ten minutes. When the timer fires, the telephony messaging server 104 gets the time from the post office 102 since it is possible that the clocks of the telephony messaging server and the post office are not synchronized (block 404). The synchronization of time between the clocks of the telephony messaging server 104 and the post office 102 is necessary to determine which address records have changed since the last poll cycle update. Once the clocks are synchronized, the telephony messaging server 104 determines whether a previous poll cycle has taken place since the time of initialization or start-up of the telephony messaging server 104 (block 406). If no previous poll cycle has taken place, that is, the telephony messaging server 104 has just been initialized or started, then the directory service 308 sends a signal to event notifier 312. Event notifier 312 in turn sends a message to administrative component 314 at post office 102 requesting the transmission of address records from post office storage 316 (block 408). Post office 102 in turn sends the appropriate address records back to directory service 308. When directory service 308 receives the address records, it populates the directory cache 118 with corresponding directory cache records (block 410).

If at block 406 a previous poll cycle had taken place, then the directory service 308 sends a signal to event notifier 312, which in turn sends a message to the post office 102 for all telephony address data that has changed since the last polling cycle (block 412). When all of the changed or new data from the post office 102 is received by the directory service 308, the data is inserted into the directory cache 118 (block 410). At this point, the telephony messaging server 104 checks to see if this is the first poll cycle after a preset time in this case 2 a.m. (block 414). If not, the polling cycle ends (block 416).

However, if the poll cycle is the first poll cycle after 2 a.m., every directory cache record in the directory cache 118 of telephony messaging server is validated with the post office 102 and corrected as necessary (block 418). The validation provides a higher level of confidence and fault tolerance in the synchronicity of the telephony messaging server 104 and the post office 102. The rationale is that it is useful to verify all of the data in the directory cache 118 to ensure that it is properly synchronized with the data in the post office, and correct such data as necessary.

Figure 5:
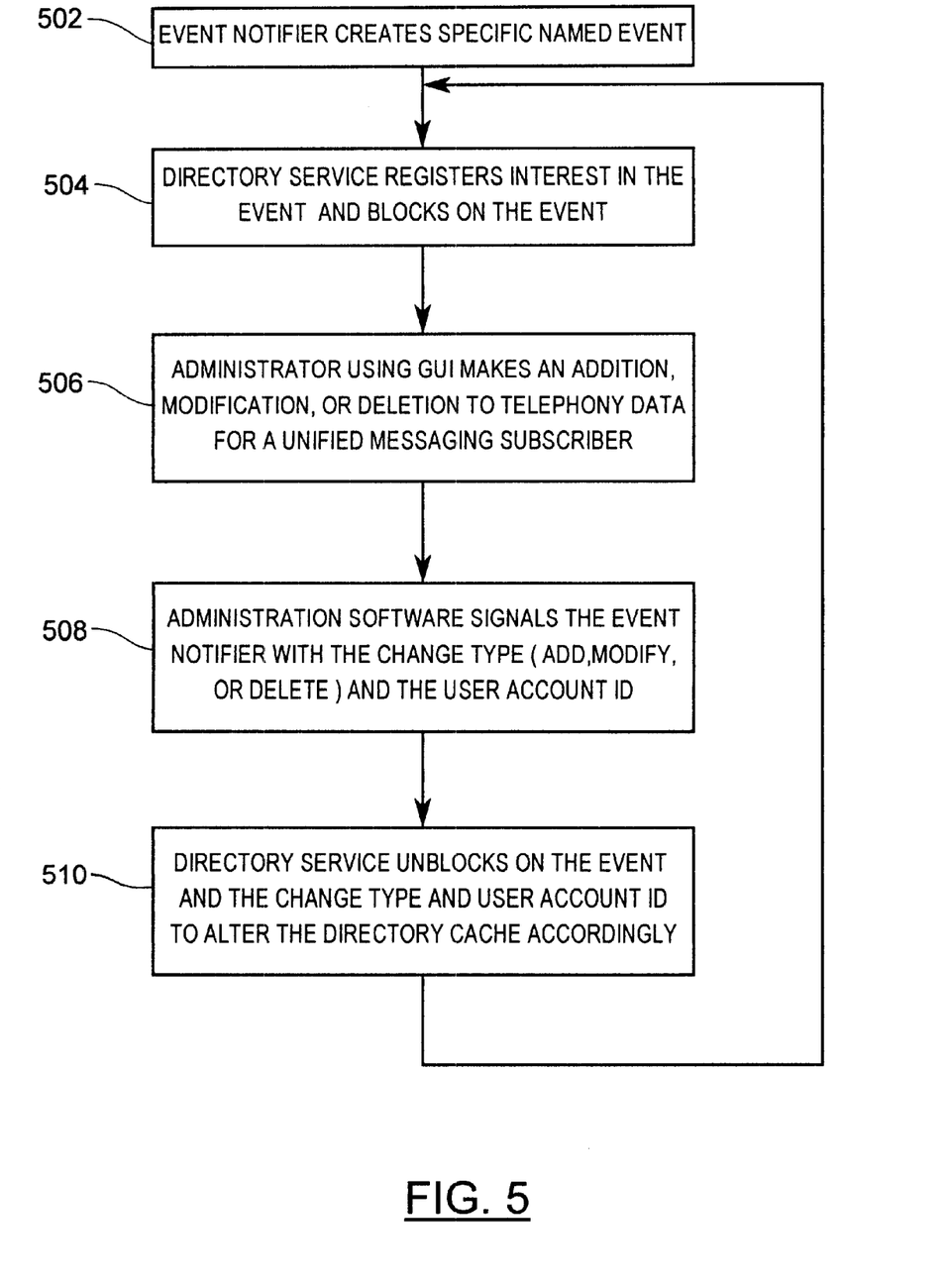
FIG. 5 is a flowchart diagram of event based synchronization of the unified messaging system of FIG. 1.

Turning now to FIG. 5, the event based synchronization methodology is illustrated. As can be seen, when the telephony messaging server 104 is initialized, the event notifier 312 generates an event (block 502).

In response to the event, the directory service 308 registers an interest in the event and blocks on the event. The directory service 308 in turn sends a signal to the event notifier 312 which in turn sends an event to the administrative component 314. The administrative component 314 in response to the event, makes an addition, modification or deletion to the address data in the post office storage 316 that is of interest to the telephony messaging server 104. The administrative component 314 then sends a signal to the event notifier 312 with the information on the event (block 508), which may include the change type (add, modify, or delete) and the user account ID. The event notifier 312 signals the directory service 308 that the specific named event has occurred. The directory service 308 in turn unblocks on the event and uses the information received from the event notifier 312 to make a specific request for the necessary data from the post office 102 to synchronize the directory cache 118 with the address directory in the post office storage 316 (block 510). The post office 102 then sends the specific data to the directory service 308 and the directory service updates the directory cache 118 accordingly. At this point, the telephony messaging server returns to step 504 and waits for the next event.

As will be appreciated, since the address information in the post office 102 and the address information in the directory cache 118 of the telephony messaging server 104 is synchronized at predetermined intervals and when certain events occur, addressing integrity in the messaging system 100 is maintained. This allows the telephony messaging server 104 to use the directory cache 118 for addressing, which stores less information than the post office, and therefore, provides for quicker searching, without compromising addressing capabilities.

Although a preferred embodiment of the present invention has been described, those skilled in the art will appreciate that variations and modifications may be made without departing from the spirit and scope thereof as defined by the appended claims.

We claim:

1. A messaging system comprising:

a post office including a first enterprise wide address directory, said first address directory being updatable and including a directory record for each addressable entity in said messaging system, each directory record of said first address directory including addressing and other information relating to the associated addressable entity, said post office also including a mailbox for each addressable entity in said messaging system in which messages relating to the associated addressable entity are stored;

a second enterprise wide address directory including a directory record for each addressable entity in said messaging system, each directory record of said second address directory including a subset of the addressing and other information relating to the associated addressable entity that is stored in the corresponding directory record of said first address directory;

a telephony messaging application handling incoming telephone calls and communicating with said post office, said telephony messaging application forwarding messages to said post office for storage in mailboxes associated with addressable entities in said messaging system and retrieving messages from mailboxes in response to input commands, said telephony messaging application accessing said second address directory for addressable entity address information to enable enterprise wide messaging to be performed via said telephony messaging application; and a synchronization mechanism synchronizing the addressing and other information of each directory record in the second address directory with addressing and other information of the corresponding directory record in the first address directory, said synchronization mechanism being triggered in response to selected events and at programmable selected intervals.

2. A messaging system according to claim 1 wherein said selected events include updates that are made to addressing information in one or more directory records of the first address directory.

3. A messaging system according to claim 2 wherein said updates include changes to critical message addressing data.

4. A messaging system according to claim 3 wherein updates to critical message addressing data include changes to spoken greetings, changes to message destination data and/or changes enabling telephone access to said messaging system.

5. A messaging system according to claim 1 wherein said synchronization mechanism further validates all addressing information in directory records of said second address directory with corresponding addressing information in directory records of said first address directory at specified second intervals.

6. A messaging system according to claim 1 wherein said synchronization mechanism is responsive to a timer in said telephony messaging application, said timer firing at said selected intervals.

7. A messaging system according to claim 6 wherein said synchronization mechanism includes an event notifier responsive to said timer and a directory service in communication with said post office, said event notifier polling said post office for addressing information in said first address directory that has changed since a previous polling cycle, said directory service receiving changed addressing information from said post office and updating directory records in said second address directory accordingly.

8. A messaging system according to claim 6 wherein said synchronization mechanism includes a clock, said synchronization mechanism synchronizing the clock with a second clock in said post office at regular intervals.

9. A messaging system according to claim 8 wherein said regular intervals are coincident with said selected intervals.

10. A messaging system according to claim 1 wherein the directory records in said second address directory have less fields than the directory records in said first address directory.

11. A messaging system according to claim 1 wherein said second address directory is stored in a directory cache.

12. A messaging system according to claim 11 wherein said directory cache provides a fast entity addressing look-up service to said telephony messaging application.

13. A messaging system according to claim 12 wherein said telephony messaging application is executed by a telephony messaging server and wherein said directory cache is stored in said telephony messaging server.

14. A messaging system according to claim 13 wherein directory records in said first address directory are updatable via said telephony messaging application.

15. A messaging system according to claim 14 wherein said post office communicates with at least one client computer system, directory records of said first address directory being updatable via said at least one client computer system.

16. A messaging system according to claim 1 wherein said post office communicates with at least one client computer system, directory records of said first address directory being updatable via said at least one client computer system.

17. A messaging system according to claim 16 wherein said synchronization mechanism is triggered in response to selected events and at selected intervals.

18. A messaging system according to claim 17 wherein said synchronization mechanism is responsive to a timer in said telephony messaging application, said timer firing at said selected intervals.

19. A messaging system according to claim 18 wherein said synchronization mechanism includes an event notifier responsive to said timer and a directory service in communication with said post office, said event notifier polling said post office for addressing information in said first address directory that has changed since a previous polling cycle, said directory service receiving changed addressing information from said post office and updating directory records in said second address directory accordingly.

20. A messaging system according to claim 19 wherein said synchronization mechanism further validates all addressing information in directory records of said second address directory with corresponding addressing information in directory records of said first address directory at specified second intervals.

21. In a messaging system, a method for synchronizing addressing information stored in a directory of a telephony messaging application with updatable addressing information stored in a directory of a post office, said method comprising the steps of:
 at selected programmable intervals, determining if changes to the addressing information in said post office directory have been made and if so, updating corresponding addressing information in said telephony messaging application directory; and
 in response to selected changes in addressing information in said post office directory, updating the corresponding addressing information in said telephony messaging application directory.

22. A method of claim 21 wherein said selected changes relate to changes to critical message addressing data.

23. A method of claim 22 wherein said selected changes to critical message addressing data include at least one of changes to spoken greetings, changes to message destination data, and changes enabling telephone access to said messaging system.

24. A method of claim 21 comprising the steps of
 firing a timer at said selected intervals; and
 updating the addressing information in said telephony messaging application directory in response to said timer if changes have been made to the corresponding addressing information in said post office directory.

25. A method of claim 24 further comprising the steps of:
 validating all of the addressing information in said telephony messaging application directory with corresponding addressing information in said post office directory at specified second intervals.

26. A method of claim 25 further comprising the steps of:
 synchronizing clocks in said telephony messaging application and said post office at regular intervals corresponding with said selected intervals.

27. In a messaging system, a method for synchronizing addressing information stored in a directory of a telephony messaging application with updatable addressing information stored in a directory of a post office, said method comprising the steps of:
 at first selected programmable intervals, determining if changes to addressing information in the post office directory have been made and if so, updating the addressing information in the telephony messaging application directory,
 in response to selected changes in addressing information in the post office directory, updating the addressing information in the telephony messaging application directory; and
 at selected second intervals validating all addressing information in the post office directory and telephony messaging directory thereby to maintain the integrity of the addressing information therein.

28. The method of claim 27 wherein changes to addressing information in said post office directory that result in said updating of the addressing information in the telephony messaging application relate to changes to critical message addressing data.

29. The method of claim 28 wherein said changes to critical message addressing data include changes to spoken greetings, changes to message destination data and changes enabling telephone access to said messaging system.

30. The method of claim 27 further comprising the steps of firing a timer at said first selected intervals and updating the addressing information in the telephony messaging application directory in response to said timer if changes have been made to the addressing information in the post office directory.

31. The method of claim 30 further comprising the step of synchronizing clocks in said telephony messaging application and said post office at regular intervals corresponding with said first selected intervals.

32. A messaging system comprising:
 a post office including a first enterprise wide address directory, said first address directory being updatable and including a directory record for each addressable entity in said messaging system, each directory record of said first address directory including addressing and other information relating to the associated addressable entity, said post office also including a mailbox for each addressable entity in said messaging system in which messages relating to the associated addressable entity are stored;
 a second enterprise wide address directory including a directory record for each addressable entity in said messaging system, each directory record of said second address directory including a subset of the addressing and other information relating to the associated addressable entity that is stored in the corresponding directory record of said first address directory;
 a telephony messaging application handling incoming telephone calls and communicating with said post office, said telephony messaging application forwarding messages to said post office for storage in mailboxes associated with addressable entities in said messaging system and retrieving messages from mailboxes in response to input commands, said telephony messaging application accessing said second address directory for addressable entity address information to enable enterprise wide messaging to be performed via said telephony messaging application;

a timer firing at first intervals; and a synchronization mechanism synchronizing the addressing and other information of each directory record in the second address directory with addressing and other information of the corresponding directory record in the first address directory, said synchronization mechanism being triggered in response to selected events and in response to firing of said timer at said first intervals.

33. A messaging system according to claim 32 wherein said second address directory is stored in a directory cache.

34. A messaging system according to claim 33 wherein said directory cache provides a fast entity addressing lookup service to said telephony messaging application.

35. A messaging system according to claim 34 wherein said telephony messaging application is executed by a telephony messaging server and wherein said directory cache is stored in said telephony messaging server.

36. A messaging system according to claim 35 wherein directory records in said first address directory are updatable via said telephony messaging application.

37. A messaging system according to claim 36 wherein said post office communicates with at least one client computer system, directory records of said first address directory being updatable via said at least one client computer system.

38. A messaging system according to claim 32 wherein said post office communicates with at least one client computer system, directory records of said first address directory being updatable via said at least one client computer system.

39. A messaging system according to claim 38 wherein said synchronization mechanism includes an event notifier responsive to said timer and a directory service in communication with said post office, said event notifier polling said post office for addressing information in said first address directory that has changed since a previous polling cycle, said directory service receiving changed addressing information from said post office and updating directory records in said second address directory accordingly.

40. A messaging system according to claim 39 wherein said synchronization mechanism further validates all addressing information in directory records of said second address directory with corresponding addressing information in directory records of said first address directory at specified second intervals.

41. A messaging system according to claim 32 wherein said selected events include updates that are made to addressing information in one or more directory records of the first address directory.

42. A messaging system according to claim 41 wherein said updates include changes to critical message addressing data.

43. A messaging system according to claim 42 wherein updates to critical message addressing data include changes to spoken greetings, changes to message destination data and/or changes enabling telephone access to said messaging system.

44. A messaging system according to claim 43 wherein the directory records in said second address directory have less fields than the directory records in said first address directory.

45. A messaging system according to claim 32 wherein said synchronization mechanism includes a clock, said synchronization mechanism synchronizing the clock with a second clock in said post office at regular intervals.

46. A messaging system according to claim 45 wherein said regular intervals are coincident with said first intervals.

47. A messaging system according to claim 32 wherein the directory records in said second address directory have less fields than the directory records in said first address directory.

* * * * *